April 23, 1957     R. H. BLOXHAM     2,789,408
PNEUMATIC NUT HARVESTER
Filed March 1, 1954     10 Sheets-Sheet 1

INVENTOR:
Ralph H. Bloxham

INVENTOR:
Ralph H Bloxham

April 23, 1957     R. H. BLOXHAM     2,789,408
PNEUMATIC NUT HARVESTER

Filed March 1, 1954     10 Sheets-Sheet 3

INVENTOR:
Ralph H. Bloxham

April 23, 1957 R. H. BLOXHAM 2,789,408
PNEUMATIC NUT HARVESTER
Filed March 1, 1954 10 Sheets-Sheet 4

INVENTOR:
Ralph H Bloxham

April 23, 1957  R. H. BLOXHAM  2,789,408
PNEUMATIC NUT HARVESTER
Filed March 1, 1954  10 Sheets-Sheet 6

INVENTOR:
Ralph H Bloxham

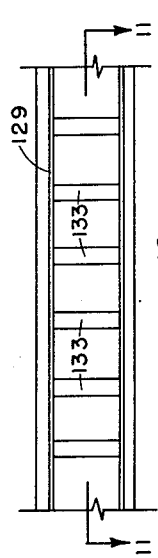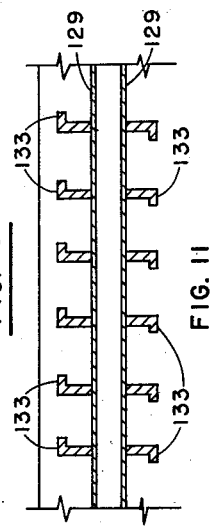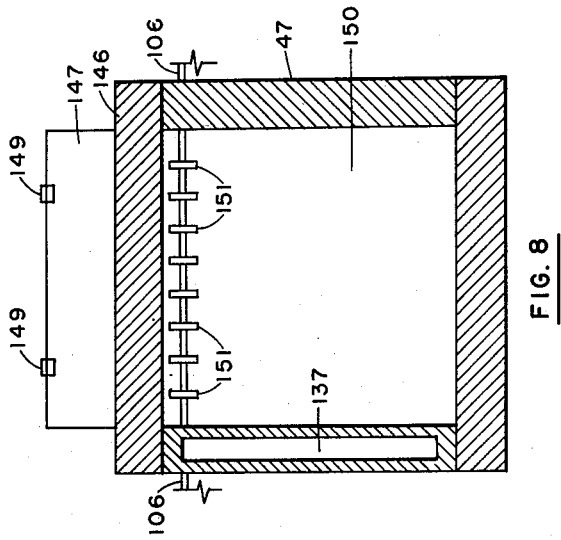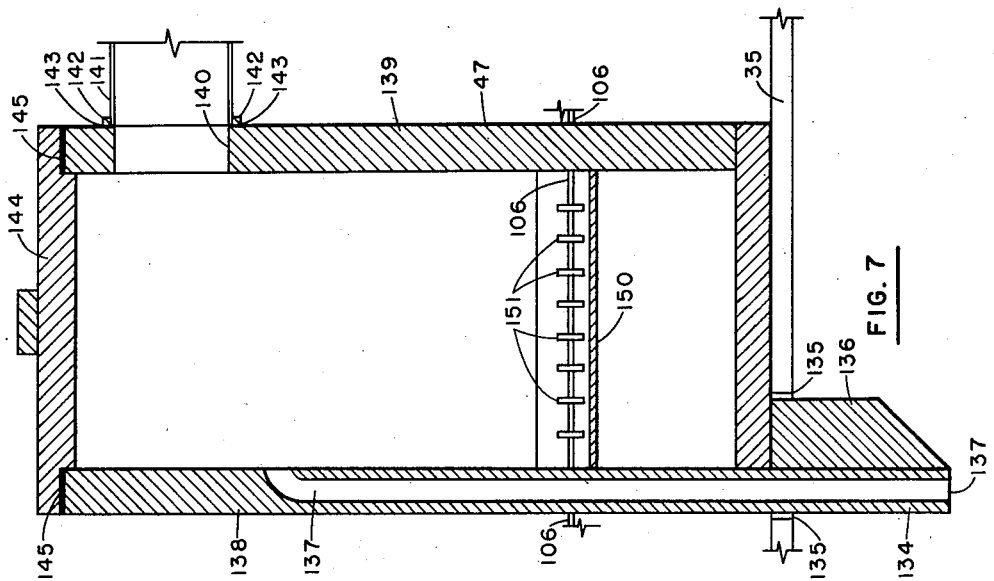

April 23, 1957 R. H. BLOXHAM 2,789,408
PNEUMATIC NUT HARVESTER
Filed March 1, 1954 10 Sheets-Sheet 8
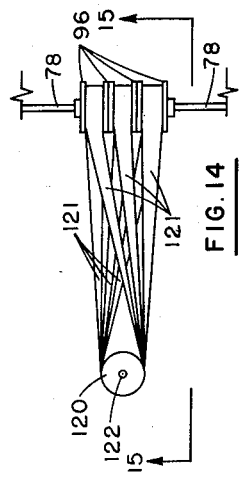
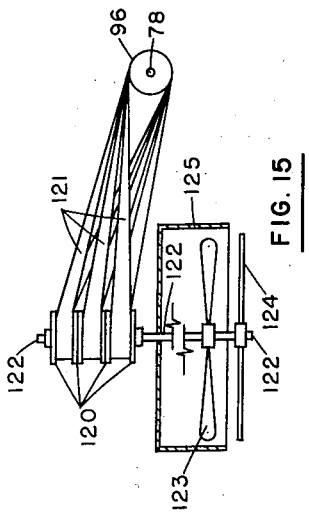
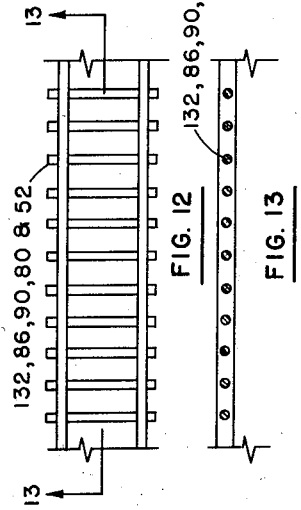
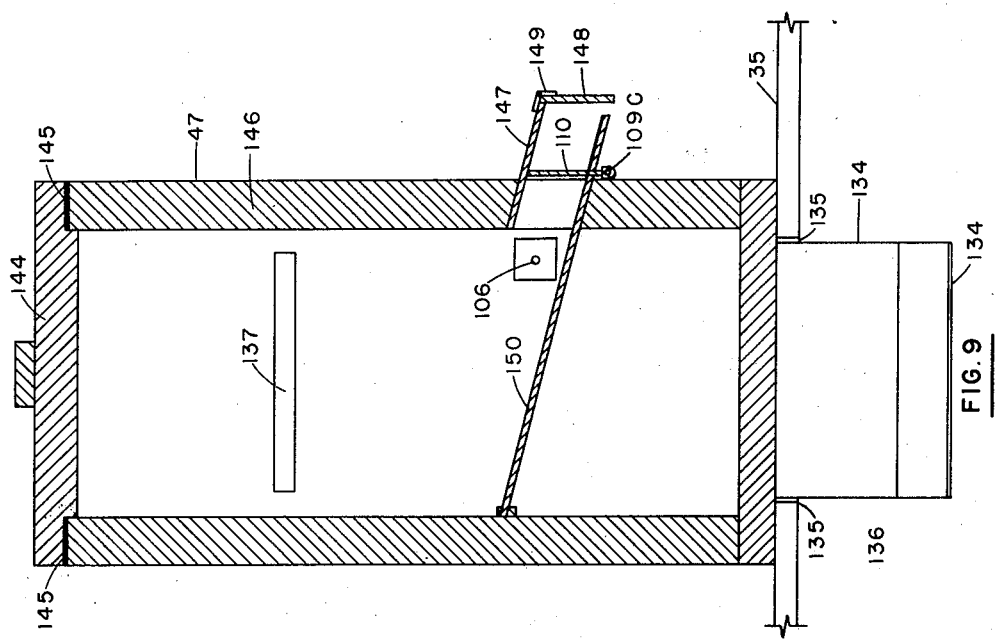
INVENTOR:
Ralph H. Bloxham

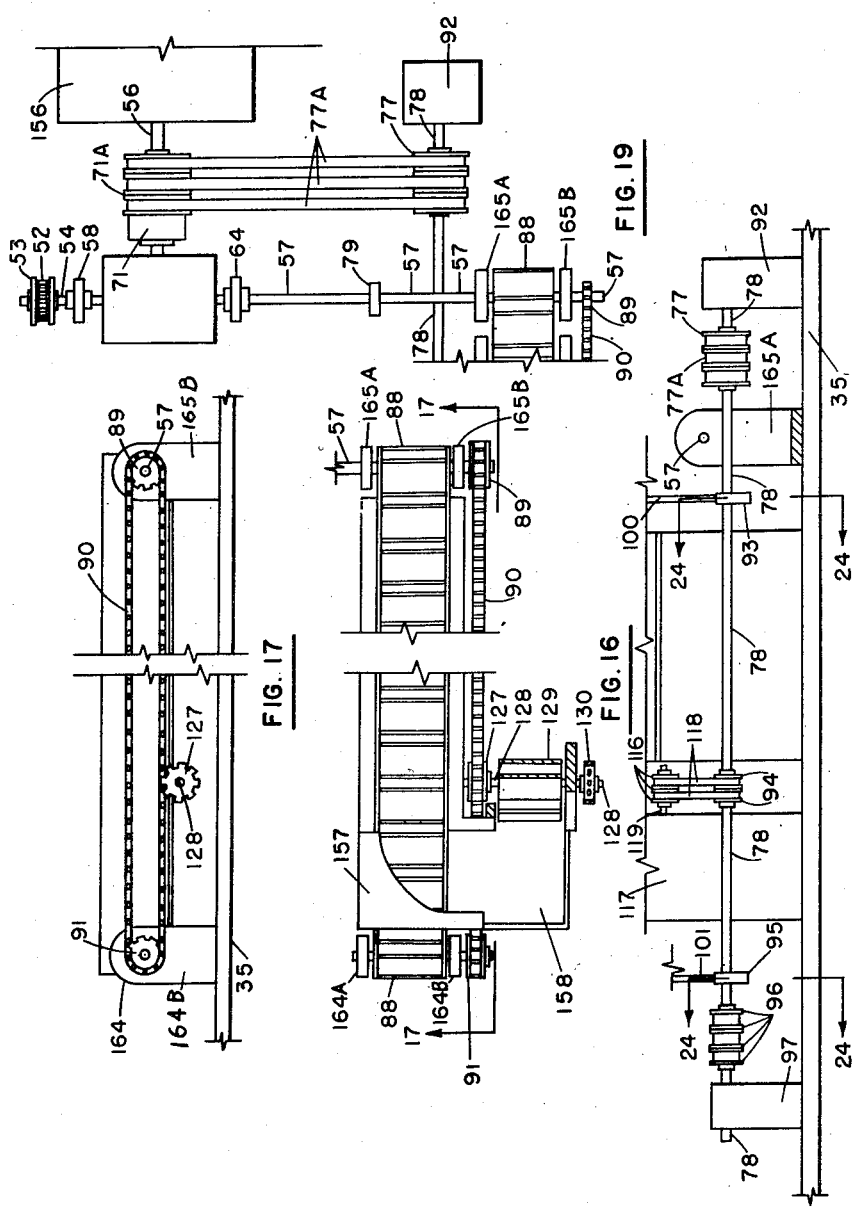

April 23, 1957     R. H. BLOXHAM     2,789,408
PNEUMATIC NUT HARVESTER
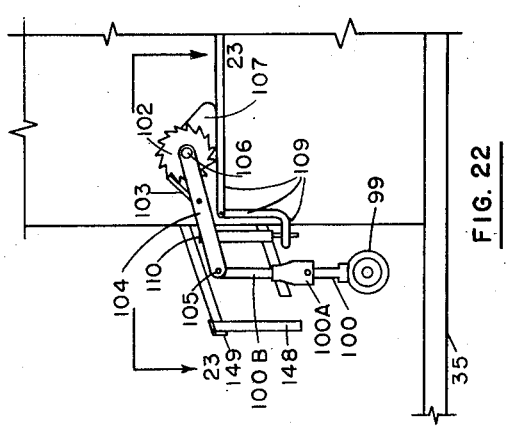
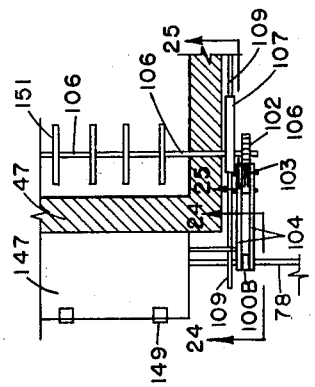
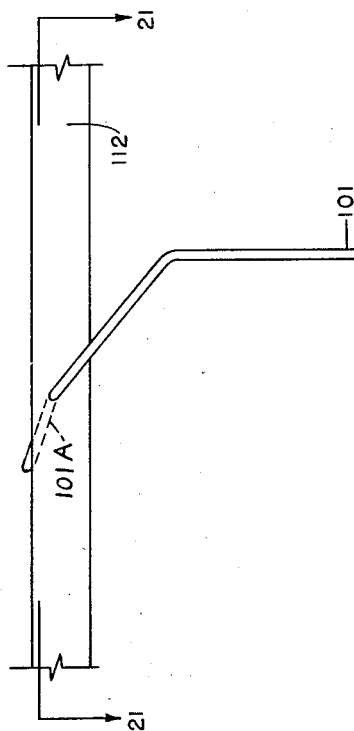
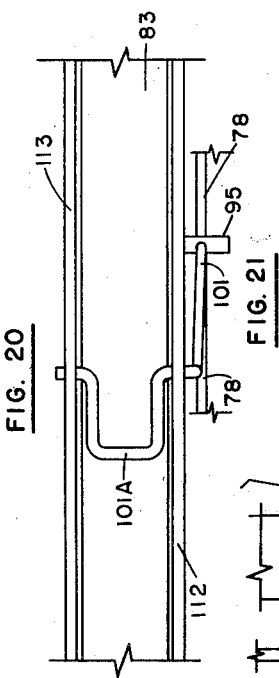
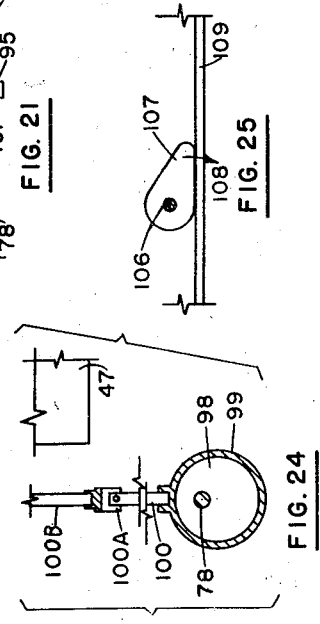
INVENTOR:
Ralph H Bloxham

United States Patent Office 2,789,408
Patented Apr. 23, 1957

2,789,408

PNEUMATIC NUT HARVESTER

Ralph H. Bloxham, Mobile, Ala.

Application March 1, 1954, Serial No. 413,143

3 Claims. (Cl. 56—328)

The present invention relates to an improvement in nut harvesters and has for its main object and purpose to provide an automatic means of harvesting nuts, cutting grass, removing the cut grass leaves and debris from the ground before the nuts are harvested, and further removing any leaves or debris which may be picked up with the nuts, all in one operation.

One of the most important advantages provided by this new invention resides in the effectiveness of the component parts in performing the operation resulting in clean nuts, quickly harvested.

Perhaps one of the most important advantages of this new invention, especially from the viewpoint of the buyer, is the low cost of operation. While the machine will travel at the rate of approximately four miles per hour, it is possible to clear the ground of nuts in an area not less than one acre in that length of time. About one gallon of gasoline will operate the complete machine over each acre and only one operator is required. A second operator could be used to some advantage to change bags at the end of the conveyor belts so the machine would not have to be stopped for this purpose, however, a second operator is not a necessity.

The first cost of the machine is comparable to the cost of automobiles in the low price field, and it will pay for itself in a short period of time, depending on how many nuts are to be harvested.

The mechanical features of the machine are simple and composite. The nuts to be removed from the ground are pulled up into a hopper by means of suction created by a vacuum pump or fan, then they are automatically emptied from the hopper on conveyor belts where air is blown on the nuts to dispose of remaining leaves and debris. They are bagged at the end of the conveyor belts or disposed of in other ways. A trailer truck could be attached to the invention, or used as a separate unit, to receive the processed nuts instead of bagging them.

Means are also provided on this new invention to move the nut harvester from location to location without operating the processing unit; to cut and dispose of grass and the lighter portion of debris before the nuts are picked from the ground; to operate the conveyor belts and the hopper while the machine is at a standstill; and it is provided with other features which will be explained as we proceed.

With these and other advantages to be pointed out as we proceed, I refer to the drawings in which like parts are denoted by the same reference characters throughout the several views, whereas:

Figure 7 is an enlarged sectional view of the hopper as taken at 7—7 in Figure 4.

Figure 8 is an enlarged sectional view of the hopper as taken at 8—8 in Figure 4.

Figure 9 is an enlarged sectional view of the hopper as taken at 9—9 in Figure 3.

Figure 10 is an enlarged partial plan view of the lift conveyor belt as taken in the direction of arrow 10 in Figure 3.

Figure 11 is a partial sectional view of the lift conveyor belt as taken at 11—11 in Figure 10.

Figure 12 is an enlarged plan view of a typical chain belt and pulleys used to drive the various shafts and conveyor belts.

Figure 13 is a sectional view of the typical chain belt as taken at 13—13 in Figure 12.

Figure 14 is an enlarged plan view of the pulley belt drive for the grass cutter and fan.

Figure 15 is a fragmentary sectional view of the device as taken at 15—15 in Figure 14.

Figure 16 is an enlarged fragmentary sectional view of the belt drive for the lower horizontal conveyor belt and the lift conveyor belt as taken at 16—16 in Figure 3.

Figure 17 is a sectional view of the belt drive for the lower horizontal conveyor belt and the lift conveyor belt as taken at 17—17 in Figure 16.

Figure 18 is an enlarged elevational view of the longitudinal shaft from which the agitators and the fans receive their motive power.

Figure 19 is an enlarged plan view of the engine shaft, the transverse shaft which provides motive power to the conveyor belts, and a partial view of the longitudinal shaft.

Figure 20 is an enlarged elevational view of the top horizontal conveyor belt agitator as taken at 20—20 in Figure 1.

Figure 21 is a sectional view of the conveyor belt showing more particularly the agitator as it appears with the conveyor belt removed, as taken at 21—21 in Figure 20.

Figure 22 is an enlarged elevational view of the mechanism used to operate an agitator and sliding door of the hopper as taken at 22—22 in Figure 1.

Figure 23 is a sectional view of part of the agitator as taken at 23—23 in Figure 22, showing more particularly the pawl and ratchet gear means used to turn the agitator, and the cam operation of the sliding door inside the chute of the hopper.

Figure 24 is an enlarged sectional view of the longitudinal drive shaft as taken at 24—24 in Figure 23 showing more particularly the method used to actuate the agitator and the vertically sliding door within the chute.

Figure 25 is an elevational view of the cam and ratchet gear means used to actuate the control rods and the sliding door as taken at 25—25 in Figure 23.

Figure 1:
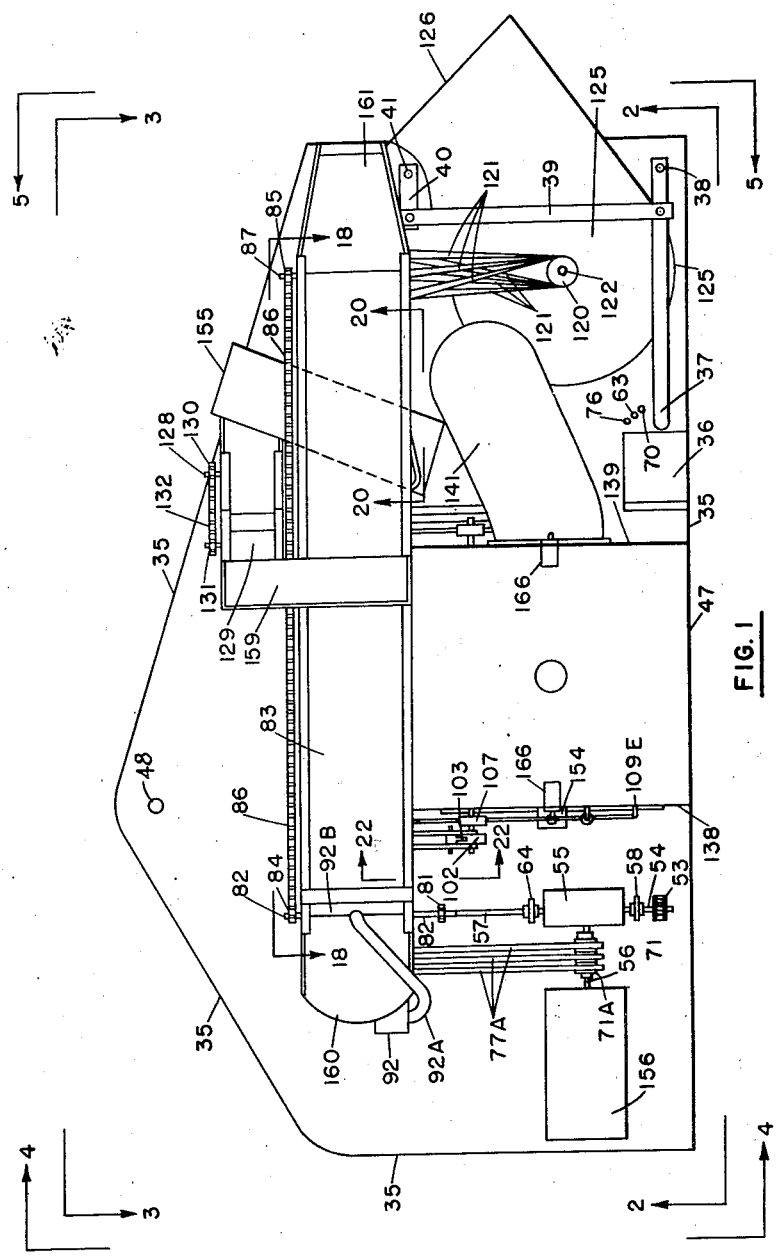
Figure 1 is a plan view of this new invention in nut harvester.

Referring more particularly to the drawings:

This new invention in nut harvesters is provided with a platform 35 upon which is attached an operator's seat 36 from which the person operating the machine may cause any and all of the operating parts to work at desired times. In front of the operator's seat 36 is a tiller 37 fulcrumed at point 38 and provided with a cross bar 39 which is movably attached to the tiller 37 and to a guide bar 40, said guide bar 40 being fixedly attached to the vertical shaft 41 of the guide wheel 42, thus providing simple guiding means for the invention. Other types of guiding means may be used.

The guide wheel 42 is positioned so that it will move over the ground outside the path to be cleared of nuts and will not run over the nuts to be harvested.

Four other wheels are provided on this new invention in nut harvester under the platform 35: the drive wheel 43 which provides the forward movement of the invention, wheels 44 and 45 which provide the support for the hopper 47, and wheel 46 which provides support for the platform 35 on the side opposite to the drive wheel 43. It should be noted that the wheel 46 is constructed in a manner similar to a caster or the like, being attached to the platform 35 off center by means of the swiveled vertical shaft 48. This wheel 46 is so constructed as to allow it to track when the nut harvester is making a turn.

The drive wheel 43 is attached to the platform 35 by means of bracket 49, or the like, which is attached to platform 35 by welding or other acceptable means. The drive wheel 43 is provided with a shaft 50 carrying a chain pulley 51 which receives a chain belt 52 connected above the platform 35 to a second chain pulley 53. The chain pulley 53 is mounted on a horizontal shaft 54 which is connected within the reduction gear box 55 to allow the proper reduction in speed below the speed of the shaft 56 of the engine 156.

On shaft 54 a clutch 58 is installed between the chain pulley 53 and the reduction gear box 55 for the purpose of operating the drive wheel 43 when desired by means of connecting rods 59, 60, 61 and 62, being attached one to the other in a movable manner and to the clutch lever 63.

A clutch 64 on shaft 57 is operated by means of connecting rods 65, 66, 67, 68 and 69 which are connected one with another in a movable manner and to the clutch lever 70.

A clutch 71 on shaft 56 is operated by connecting rods 72, 73, 74 and 75 which are connected one to another in a movable manner and to the clutch lever 76. It should be noted that all three clutches are operable from the operator's seat 36. The purpose of these clutches 58, 64 and 71 is to allow the separate operation of the various mechanical features of this new invention which will be discussed as we proceed. For an instance, the shaft 54 carries the chain pulley 53, which when the clutch 58 is in an engaged position, allows the nut harvester to be moved over the ground through the application of power to the drive wheel 43, yet equally serves the purpose of allowing the machine to remain stationary when the clutch 58 is not engaged.

The second clutch 64 on the shaft 57 controls the operation of the conveyor belts, while the clutch 71 on shaft 56 provides motive power for a longitudinal shaft which operates the fan units, agitators and grass cutting mechanisms. This clutch 71 is of the type which allows the engine shaft 56 to turn at all times the engine 156 is operating, but must be engaged through the various connecting rods and the clutch lever 76 to operate the triple pulleys 71A, triple pulley belts 77A, triple pulleys 77, and, thus, the shaft 78. Actually, the shaft 78 rotates faster than the shafts 54 and 57'.

Figure 2:
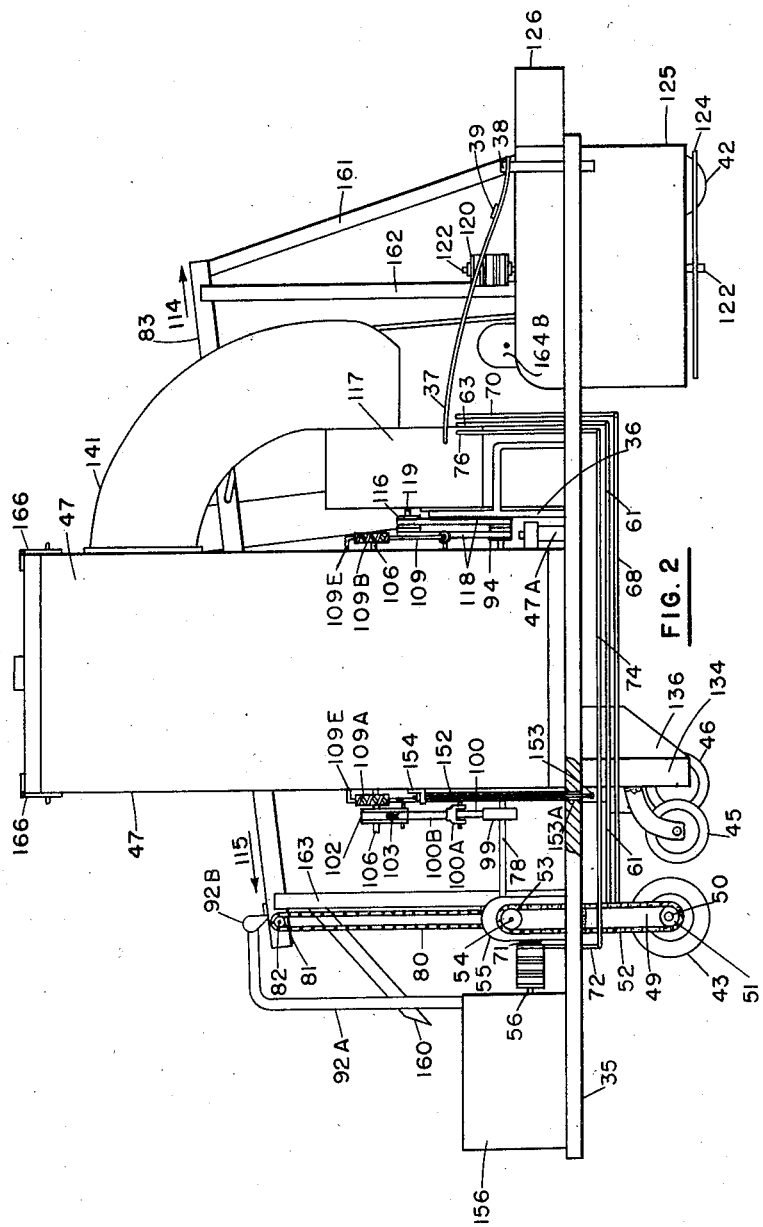
Figure 2 is a side elevational view as taken at 2—2 in Figure 1 with parts broken away and shown in section.

Referring more particularly to Figures 1 and 19, the shaft 57 is connected between the reduction gear box 55 and the support 165. Attached to shaft 57 is a chain pulley 79 which is connected by means of chain belt 80 to a chain pulley 81, which is attached to a shaft 82 upon which the top conveyor belt 83 is caused to move, turning in a clockwise manner when viewed in Figure 2. On the outer end of shaft 82 is attached a second chain pulley 84, more clearly viewed in Figure 1, which is connected to the chain pulley 85 at the opposite end of the top conveyor belt 83 (see Figure 3) by means of chain belt 86 for the purpose of turning the shaft 87 and thus the top conveyor belt 83.

Shaft 57 also provides motive power for the lower horizontal conveyor belt 88. To allow both ends of the lower horizontal conveyor belt 88 to be motivated, a chain pulley 89 is attached to the outer end of shaft 57 and by means of chain belt 90 to a chain pulley 91 at the opposite end of the lower horizontal conveyor belt 88.

Figure 3:
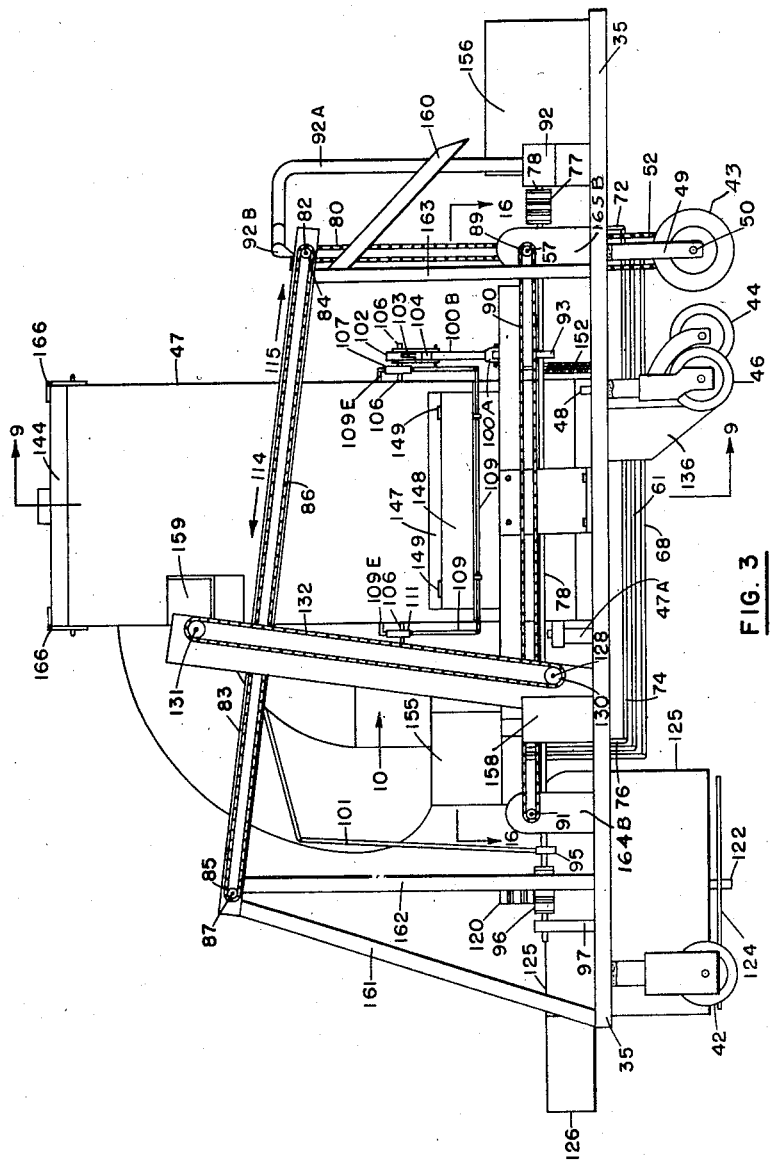
Figure 3 is a side elevational view as taken at 3—3 in Figure 1.

As viewed in Figure 3, both the lower horizontal conveyor belt 88 and the top conveyor belt 83 move in a counter-clockwise manner, the purpose to be explained as we proceed.

Figure 4:
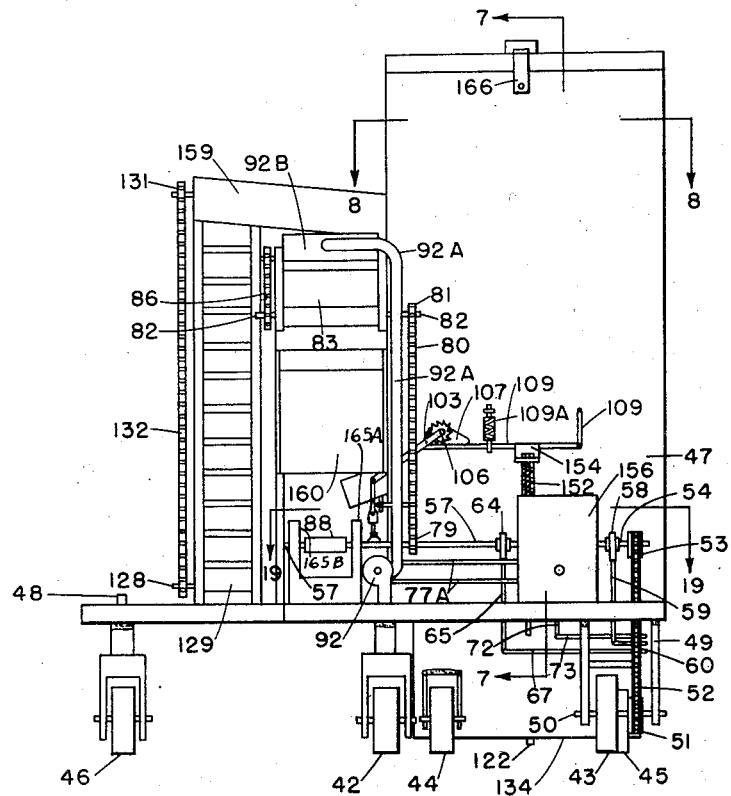
Figure 4 is an end elevational view as taken at 4—4 in Figure 1.

The shaft 78, which runs longitudinally of the nut harvester, as viewed in Figures 3, 18 and 19, is attached at its rear end to a blower 92 which supplies air to blow away any leaves or debris, that have not already been removed from the nuts, by means of hose 92A and an exhaust tube 92B as seen in Figures 1 and 4.

As stated above, the power for rotating the shaft 78 is obtained from the shaft 56 through application of a clutch 71. A triple pulley 71A is constructed to work with the clutch 71 and through the application of triple pulleys 77 on shaft 78 and triple pulley belts 77A, the shaft 78 is caused to turn when the clutch 71 is in an engaged position.

Besides the triple pulleys 77, a cam device 93, double pulleys 94, a second cam device 95, triple pulleys 96, and support 97 are also installed on shaft 78. The cam device 93 may be viewed more clearly in Figure 24, wherein the cam 98 mounted on the shaft 78 works within a cam box 99 to allow an upward and downward movement of the cam box 99 and, thus, to the rod to which it is attached. Cam device 95 is similar. In the case of cam device 93 and cam box 99 is attached to the rod 100 and in the case of the cam device 95 the cam box 99 is attached to the agitator rod 101.

Cam box 99 and rods 100 and 100B operate a ratchet gear 102 through application of a pawl 103 (viewed more clearly in Figures 22 and 23) which is movably attached between the rods 104. Rods 100B and 104 are provided with a ball joint connection 104A at point 105 while rod 100 and rod 100B are swively connected at point 100A. The upward and downward movement of the rods 100 and 100B, through the action of the cam 98, causes the pawl 103 to turn the ratchet gear 102 and thus turn also the shaft 106 to which the ratchet gear 102 is fixedly attached. In turning the shaft 106 in this manner, a cam 107 which is also firmly and fixedly attached to the shaft 106, is caused to move in the direction of rotation as indicated by the arrow 108 in Figure 25 and thus pushes downward the operating bar 109 and bar 109G and the sliding door 110.

On the opposite sides of the hopper 47 (as viewed in Figure 3) the bar 109H and rod 109G are operated by a cam 111 on shaft 106 which is constructed and works identically to the cam 107. The operating bar 109 is attached to the hopper 47 at points 109E and operating bar 109G to the sliding door 110 by clamps 109C. Thus, by the cam 107 and 111 pushing the operating bar 109 downward, and the springs 109A and 109B pulling the rod 109 upward, the sliding door 110 is caused to move upward and downward through the application of operating bar 109G, the purpose to be described as we proceed.

The cam device 95, as viewed more clearly in Figures 20 and 21, performs a different service. The agitator rod 101 extends upward to the top conveyor belt 83 passing through the side rails 112 and 113. The agitator rod 101 is formed in a U-shape, as indicated by the numeral 101A, between these side rails 112 and 113. The upward and downward movement of the agitator rod 101, through the action of the cam device 95, causes the U-shaped part 101A of the agitator rod 101 to move upward and downward under the top run of the top conveyor belt 83, thus bouncing this top run of the top conveyor belt 83 up and down. This action is for the purpose of freeing any leaves or debris which may be left under the nuts at this point. As viewed in Figure 3, it should be noted that the top conveyor belt 83 moves in a counter-clockwise manner as indicated by arrow 114, but the weight of the nuts as well as their shape will cause them to move in the direction of the arrow 115 since the right end (as viewed in Figure 3) of the top conveyor belt 83 is lower than the left end. Since leaves and debris are lighter and not of a shape to encourage their rolling to the lower end, they will be caused to move in the direction of the arrow 114 to be carried down the chute 161 and exhausted out beyond the path of the machine.

Also, on the shaft 78, are double pulleys 94 which are connected to pulleys 116 on the vacuum fan 117 (seen in Figures 2 and 18) by means of double pulley belts 118; the pulleys 116 being attached to the shaft 119 on the vacuum fan 117.

A second set of triple pulleys 96 are installed on the shaft 78 and are attached to the triple pulleys 120 by means of triple pulley belts 121. The triple pulleys 120 are mounted on a vertical shaft 122 (seen more particularly in Figures 14 and 15) which also carries mounted thereon a fan blade 123 and a cutter blade 124 which cuts and pulls the grass and debris upward through the metal housing 125 and exhausts it out the end 126 of the housing 125 and beyond the path of the nut harvester.

Figure 5:
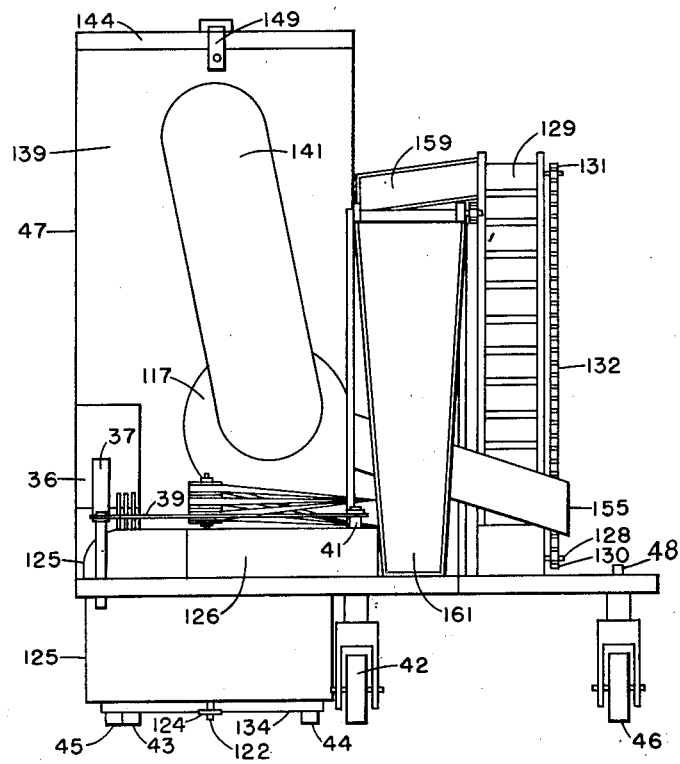
Figure 5 is an end elevational view as taken at 5—5 in Figure 1.
Figure 6:
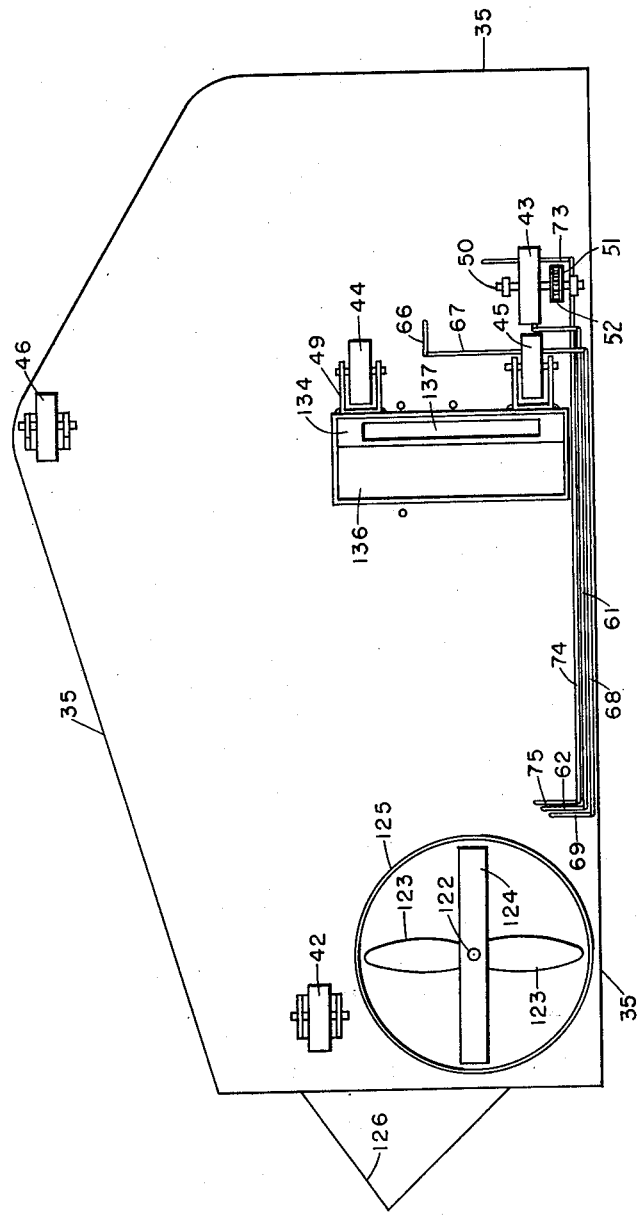
Figure 6 is a bottom plan view of this new invention.

Referring to Figures 16 and 17, the chain belt 90, connecting the chain pulleys 89 and 91, also operates a third chain pulley 127 mounted on a shaft 128 which operates a lift conveyor belt 129. On the outer end of the shaft 128 is attached another chain pulley 130 which is attached to a chain pulley 131 at the top of the lift conveyor belt 129 (as seen in Figure 5) by means of chain belt 132, thus operating the lift conveyor belt 129 at both the top and the bottom. As viewed in Figure 17, the chain belt 90 moves in a counter-clockwise manner as stated above, and since the chain pulley 127 is connected to the bottom of the chain belt 90, it is caused to move in a clockwise manner, thus moving the lift conveyor belt in a clockwise manner, as viewed in Figure 3.

The construction of the lift conveyor belt 129 is more clearly shown in Figures 10 and 11, being possessed of L-shaped carrier blades 133. Other types may be used than those depicted.

As viewed in Figures 1 through 9, the hopper 47 is not firmly attached to the platform 35, but sits on a three point suspension provided by the wheels 44 and 45 and a swivel connection 47A which is on the side of the hopper 47 opposite to the side supported by the wheels 44 and 45. As shown in Figures 7 and 9, the intake structure 134 projects through a hole 135 in the platform 35 and a protection block 136 is attached to the front of the intake structure 134 for protection against obstacles. As seen more clearly in Figures 6, 7 and 8, this intake structure 134 is provided with a rectangular shaped hole 137 which projects upward through the wall 138 of the hopper 47 and inward to the inside of the hopper 47. On the wall 139 (seen in Figure 7) a hole 140 is provided for the intake of the vacuum fan 117. A flexible hose 141 is attached to the hopper 47 in any airtight manner, shown as a flange 142 welded at point 143 to the hopper 47. The opposite end of the hose 141 is connected to the intake of the vacuum fan 117. The hopper 47 is airtight, being of a welded or other efficient construction, and is provided with a top 144 having a gasket 145 positioned to contact the hopper 47 all around the top of the sides. When the vacuum fan 117 is turned on, air can be pulled into the inside of the hopper 47 only through the hole 137. The hole 137 is of a smaller area than the hole 140 and the flexible hose 141 and a greater suction and velocity is thereby created in the hole 137 than is created in the hose 141. This suction of air through the hole 137 picks up all the nuts from the ground that are positioned under the hole 137 as it progresses over the ground. When the nuts enter the hopper 47, however, the larger area therein lowers the velocity and the nuts fall downward while most of the lighter leaves and debris that have been picked up with the nuts are pulled out of the hopper through the hole 140 and hose 141, through the vacuum fan 117, and out the exhaust duct 155, to be exhausted out of the path of the machine.

As seen in Figure 9, on the side 146 of the hopper 47 is installed a chute 147 having a sliding door 110 therein, which is operated as described above. A hinged door 148 is attached to the outside end of the chute 147 by means of hinges or the like 149. A sloping false bottom 150 is installed within the hopper 47 to assist the nuts toward the chute 147. The shaft 106, which is operated through the action of the cam device 93, rods 100, 100B and 104, and the ratchet gear 102, is provided with agitator plates 151 which are fixedly attached thereto by means of welding or the like. As the shaft 106 turns the agitator plates 151 are also caused to turn and thus stir the nuts as they pass the shaft 106.

To relieve the weight of the hopper 47 on the wheels 44 and 45 so they may easily progress over soft ground and to keep the intake structure 134 at a certain height above ground, the spring 152 is mounted on a guide rod 153 which is attached by means of bracket 154 to the side of the hopper 47. The bottom end of the guide rod 153 passes through the platform 35, moving freely up and down therein through a hole 153A, seen in Figure 2. This spring 152 acts in a manner similar to a shock absorber as well as a support. Since the hopper 47 is attached to the platform 35 only by the swivel connection 47A and is supported by the wheels 44 and 45 connected to the bottom of the intake structure 134, the whole hopper 47 is caused to move upward and downward as the wheels 44 and 45 roll over and are controlled in movement by the contours of the ground.

In operation the nut harvester is propelled over the ground when the operator starts the engine 156 and puts the clutch 58, on shaft 54, in position to operate the drive wheel 43, whereupon the machine will be caused to move forward over the ground. When in position to pick up nuts the clutch 64 is placed in operating position to turn the shaft 57 and thus starts the conveyor belts. The clutch 71, on shaft 56, is then placed in operating position and this causes the shaft 78 to rotate, thus starting the grass cutting, fan units, and agitating mechanisms.

Thus, as the nut harvester moves over the ground, the blades 124 cut the grass and the fan blades 123 pull upward the cut grass, leaves and lighter debris and passes it through the metal housing 125 and through the end of the housing 126 to exhaust it out of the path of the nut harvester. This cutting and clearing of the grass, leaves and debris does not in any way disturb the nuts and as the intake structure 134 passes over them, suction created by the vacuum fan 117 through the rectangular shaped hole 137 causes the nuts to be pulled upward through the rectangular shaped hole 137 and into the hopper 47. Since the nuts are heavier than the leaves and debris which will also be pulled up into the hopper 47 through the hole 137, the nuts will fall to the false bottom 150, especially in view of the fact that the velocity of the air in the hopper 47 is less than in the hole 137. Since the leaves and debris are lighter they will, in most part, be carried up through the hole 140 and the hose 141 to exhaust out through the exhaust duct 155 to a point beyond the path of the nut harvester.

As seen more clearly in Figure 9, when the nuts fall from the hole 137 to the false bottom 150 they move downward until stopped by the sliding door 110. Through the action of the operating bar 109, the sliding door 110 is caused to move downward at intervals and the nuts are allowed to pass out into the section of the chute 147 between the sliding door 110 and the hinged door 148, the suction created within the hopper 47 by the vacuum fan 117 causing this hinged door 148 to remain shut until the sliding door 110 is again raised by action of the springs 109A and 109B when the cam 107 and 111 release the operating bar 109. The suction within the hopper 47 is thereby shut off by the sliding door 110 and the hinged door 148 is free to swing outward, which is encouraged by the weight of the nuts. The nuts then fall on the lower horizontal conveyor belt 88 which carries the nuts in a counter-clockwise direction when viewed in Figures 3, 16 and 17. When the nuts are near the end of the conveyor belt 88 a guide stop 157 causes them to fall into a retainer bin 158 which is located at the bottom of the lift conveyor belt 129 where the L-shaped carrier blades 133 pick up the nuts and carry them to the top of the lift conveyor belt 129. There the nuts are dropped from the lift conveyor bolt 129 into a chute 159 (seen more particularly in Figure 1). From that point the nuts drop on the top horizontal conveyor belt 83. Due to the slope of this conveyor belt 83, even though the belt moves in the opposite direction, the nuts, being round and heavy, will move in the direction of the arrow 115 to fall off the top conveyor belt 83 to the chute 160 where they are carried to a bag placed under the lower end of the chute 160 or disposed of in other ways. Air from the exhaust tube 92B blows over the nuts as they pass on the top conveyor belt 83, thus removing any remaining leaves and debris.

As mentioned above, the U-shaped part 101A of the agitator rod 101 bounces the nuts up and down as they move in the direction of the arrow 115 thus freeing the leaves and debris at that point. Since the leaves and debris do not tend to roll in the direction of the arrow 115 they will be carried in the direction of travel of the top conveyor belt 83 as indicated by the arrow 114 where they will fall off the top conveyor belt 83 on a chute 161 to be thereby carried to the ground out of the path of the intake structure.

It is understood, of course, that the conveyor belts will be provided with necessary supporting means such as braces 162 and 163, seen in Figure 3, while the shafts carrying the pulleys will also be supplied with supports such as 164A, 164B, 165A and 165B.

Clamps 166 attach the top 144 to the hopper 47 to keep it from bumping off or being blown off by the wind when no suction is created inside the hopper 47, but these clamps 166 are not for the purpose of making the hopper airtight since the suction created within the hopper 47 will cause the top 144 to pull tightly against the gasket 145 and the top of the sides, thus creating an air seal.

Of course, it is understood that the various working parts are constructed and designed to operate at predetermined times, and to coordinate in operation so that maximum efficiency may be had. A working model has been designed and constructed and it works in the manner shown and described herein.

While I have disclosed the best form of the invention known to me at the present time, I desire it to be understood that I reserve the right to make alterations and changes insofar as such changes and alterations are covered by the appended claims.

I claim:

1. In a nut harvester, a powered wheeled platform, a vacuum hopper flexibly mounted on said platform, said hopper having four vertically disposed sides or walls, a top and a bottom, one of said walls having an extension extending below said bottom and through said platform to a free end disposed at a predetermined point above the ground to be traversed, said wall and extension having a hole extending from said free end to an upper portion of said wall where it opens into said hopper, the wall opposite said last mentioned wall having an outlet opening therein, a vacuum fan assembly mounted on said platform, a flexible hose connecting said fan assembly and said outlet opening, a sloping floor suspended within the said vacuum hopper from the side walls thereof, an outlet chute installed within one wall of said vacuum hopper at a point adjacent the low side of the said sloping floor, and interconnecting powered conveyor belts installed on said platform adjacent the said outlet chute.

2. In a nut harvester, a powered platform, a vacuum hopper flexibly mounted on said platform, said hopper having four vertically disposed sides or walls, a top and a bottom, said top being removable, one of said walls having an extension extending below said bottom and through said platform to a free end disposed at a predetermined point above the ground to be traversed, said wall and extension having a hole extending from said free end to an upper portion of said wall where it opens into said hopper, the wall opposite said last mentioned wall having an outlet opening therein, a vacuum fan assembly mounted on said platform, a flexible hose connecting said fan assembly and said outlet opening, a sloping floor suspended within said vacuum hopper from the side walls thereof and provided with a discharge opening within one wall of said vacuum hopper at a point directly in line with the low side of said sloping floor, said discharge opening being normally closed.

3. In a nut harvester, a powered wheeled platform, steering means provided on and attached to said platform, a vacuum hopper flexibly mounted on said platform, said hopper having four vertically disposed sides or walls, a top and a bottom, said top being removable, one of said walls having an extension extending below said bottom and through said platform to a free end disposed at a predetermined point above the ground to be traversed, said wall and extension having a hole extending from said free end to an upper portion of said wall where it opens into said hopper, the wall opposite said last mentioned wall having an outlet opening therein, a vacuum fan assembly mounted on said platform, a flexible hose connecting said fan assembly and said outlet opening, a sloping floor suspended within said vacuum hopper from the side walls thereof, horizontally disposed agitating means attached to and between two walls of said vacuum hopper at a point above said sloping floor, a discharge opening mounted within one wall of said vacuum hopper immediately adjacent to and above the low side of said sloping floor, and powered conveying means mounted on said platform adjacent the discharge opening in said vacuum chamber.

References Cited in the file of this patent
UNITED STATES PATENTS

| | | |
|---|---|---|
| 778,576 | Groff | Dec. 27, 1904 |
| 1,139,492 | Creekmore | May 18, 1915 |
| 1,808,928 | Lint | June 9, 1931 |
| 1,827,559 | Beazley | Oct. 13, 1931 |
| 2,328,713 | Dowd et al. | Sept. 7, 1943 |
| 2,471,326 | Hoyt | May 24, 1949 |
| 2,477,389 | Oehler et al. | July 26, 1949 |
| 2,499,037 | Roles | Feb. 28, 1950 |
| 2,502,810 | Waters | Apr. 4, 1950 |
| 2,593,625 | Stokes | Apr. 22, 1952 |
| 2,594,776 | Hiatt | Apr. 29, 1952 |
| 2,679,133 | Soderholm | May 25, 1954 |